G. AMONSEN.
TRACTION ENGINE.
APPLICATION FILED NOV. 19, 1917.
1,372,635.
Patented Mar. 22, 1921.
3 SHEETS—SHEET 1.
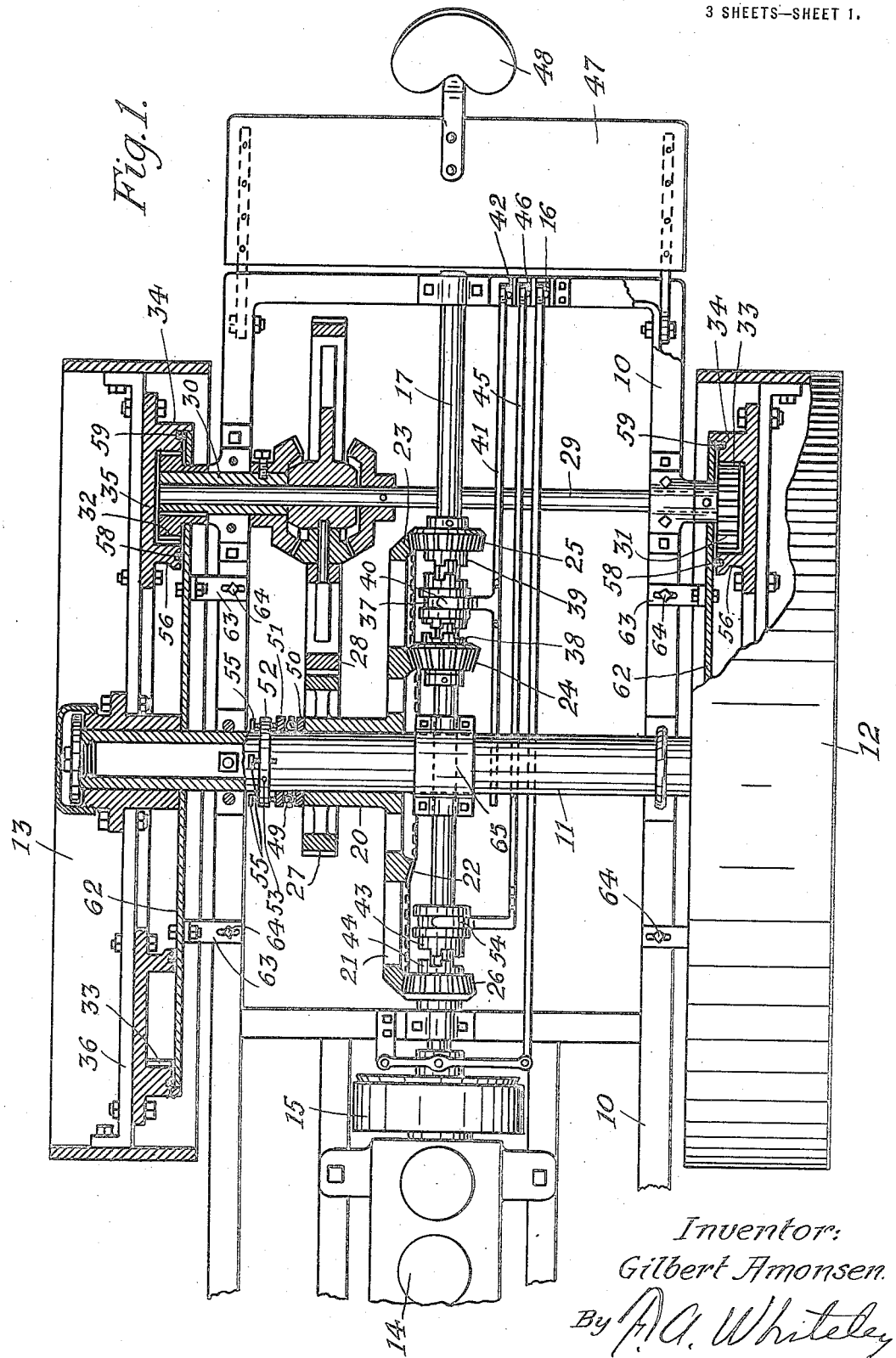
Inventor:
Gilbert Amonsen.
By A. A. Whiteley
his Attorney

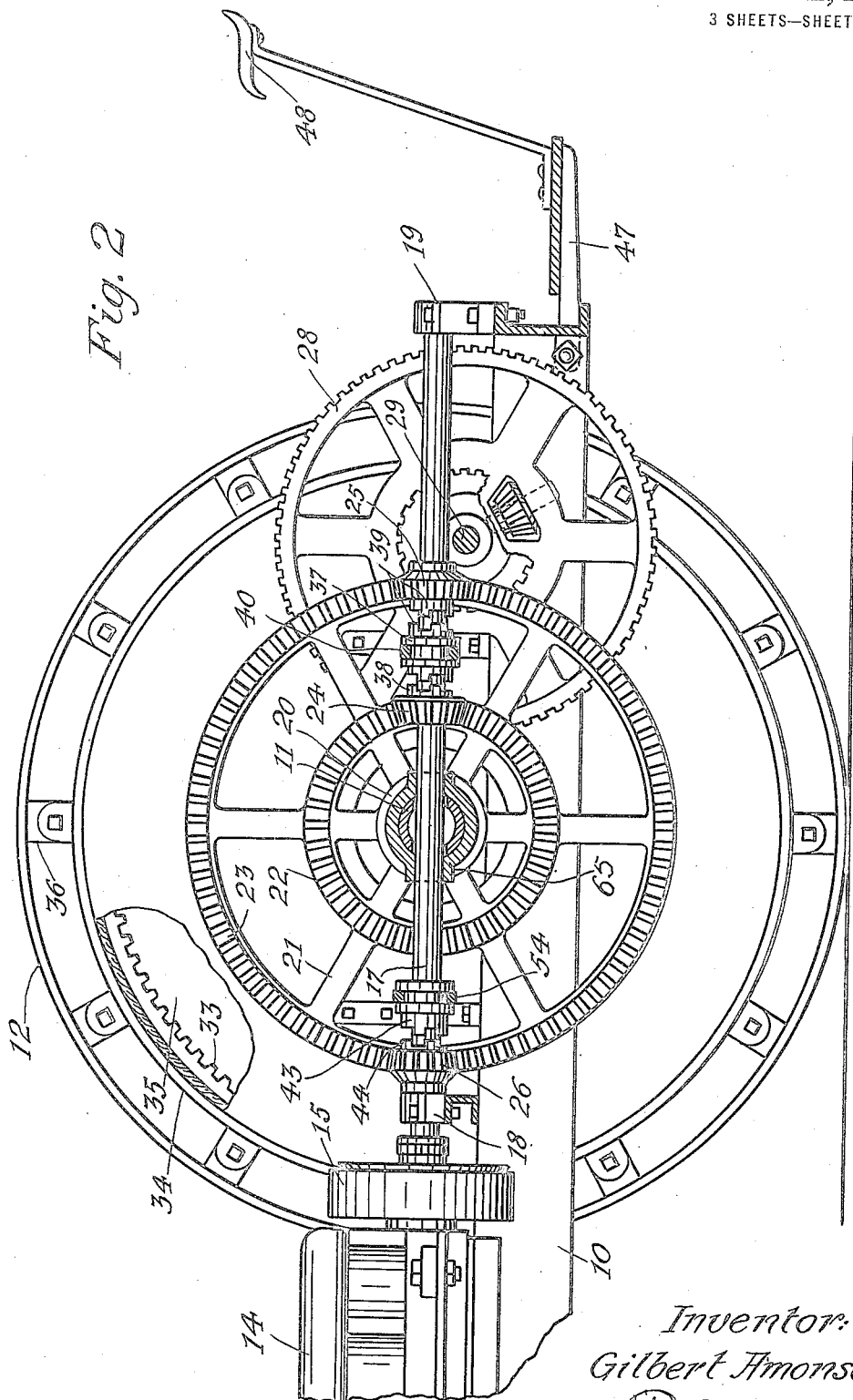

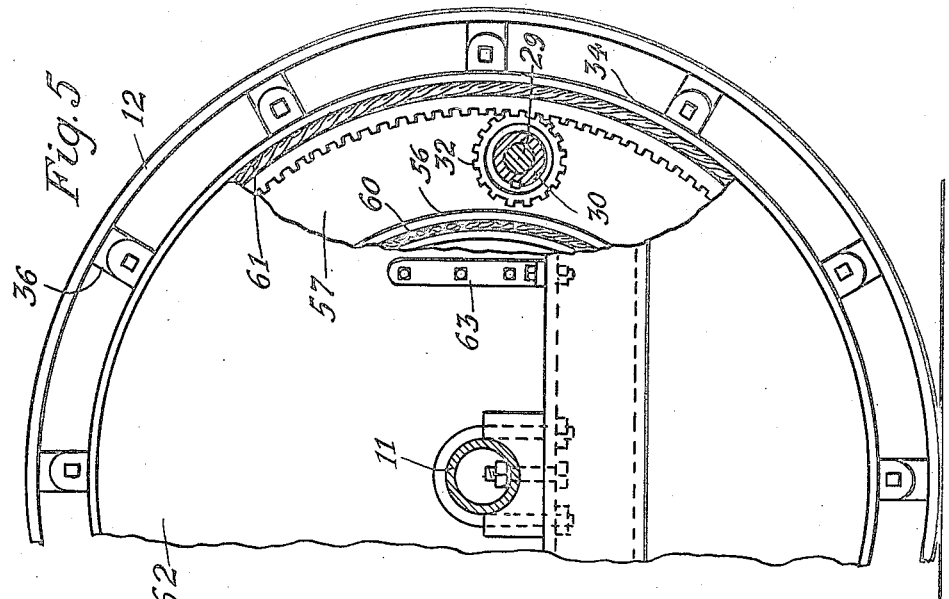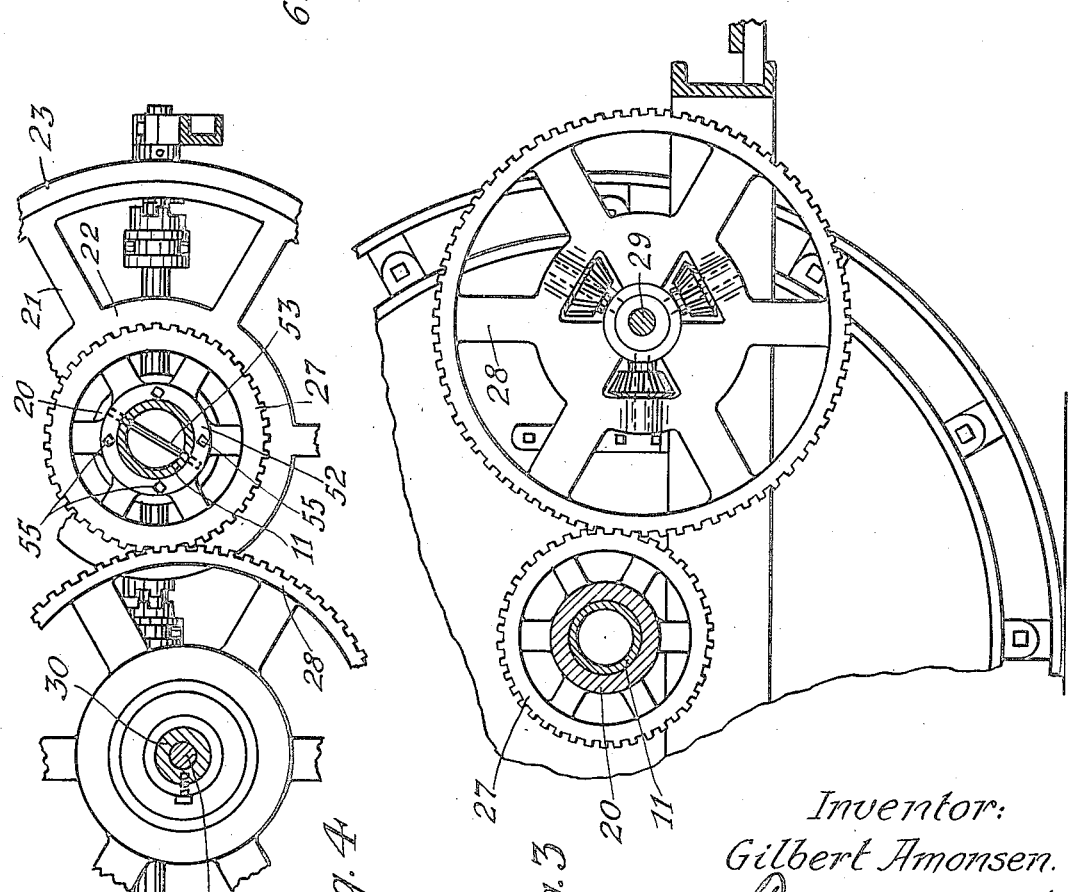

UNITED STATES PATENT OFFICE.

GILBERT AMONSEN, OF MINNEAPOLIS, MINNESOTA.

TRACTION-ENGINE.

1,372,635.   Specification of Letters Patent.   Patented Mar. 22, 1921.

Application filed November 19, 1917. Serial No. 202,859.

*To all whom it may concern:*

Be it known that I, GILBERT AMONSEN, a citizen of the United States, residing at Minneapolis, in the county of Hennepin and State of Minnesota, have invented certain new and useful Improvements in Traction-Engines, of which the following is a specification.

My invention relates to traction engines and more particularly the driving and transmission mechanism thereof, and has for its object to provide peculiarly efficient driving means for effecting two speeds forward and reverse speeds for a traction engine, or any other form of power-driven vehicle such as a truck, together with efficient means for housing and greasing the driving gears.

The full objects and advantages of my invention will appear in connection with the detailed description thereof and are particularly pointed out in the claims.

In the drawings, illustrating the application of my invention in one form,—

Figure 1 is a part sectional plan view of a tractor embodying my improvements. Fig. 2 is a longitudinal sectional view of a traction engine with some parts broken away. Figs. 3 and 4 are fragmentary sectional detail views showing features of the transmission. Fig. 5 is a side elevation of one of the housings with the case broken away showing the manner of inclosing and greasing the gear.

As illustrated, a frame 10 is supported through an axle 11 by traction wheels 12, 13. It will be understood that the axle member may be made in separable parts for convenience, if desired. A motor 14 upon said frame has its crankshaft connected through a sliding clutch 15 controlled by lever 16 with a central drive shaft 17 which is supported by journal boxes 18 and 19 secured to the frame, and which driving shaft passes directly through the axle 11, and a journal box 65 secured thereto as clearly indicated in Figs. 1 and 2. Journaled upon the axle 11 is a hub sleeve 20 to which is secured a spider 21 having thereon a pair of concentric bevel gears 22 and 23. The gear 22 meshes with a bevel pinion 24 loose on shaft 17, and the gear 23 meshes with two bevel pinions 25 and 26 loose on shaft 17 and on opposite sides of the axis of the bevel gear 23. Upon the sleeve 20 is a spur pinion 27 which meshes with a differential spur gear 28 connected in the usual way through a shaft 29 and sleeve 30 thereon with driving pinions 31 and 32 which mesh, respectively, with internal gears 33 formed on the inside of an annular flange 34 carried by a plate 35 bolted to the spokes 36 of the traction wheels. A double-faced clutch 37 is splined to shaft 17 and is adapted to coöperate with clutch members 38 and 39 on the bevel pinions 24 and 25, respectively, whereby the shaft 17 is placed into driving connection with either the small bevel gear 22 or the large bevel gear 23 for effecting driving connection with the traction wheels in a forward direction at either of two speeds. A clutch fork 40 on a shifter rod 41 controlled by a lever 42 operates the clutch 37. A clutch 43 splined on shaft 17 is adapted to coact with a clutch face 44 on bevel pinion 26 for effecting driving connection with the traction wheels in reverse direction. The clutch 43 is controlled through a clutch fork 54, shifter rod 45 and lever 46. The control levers 16, 42 and 46 are located in front of the driver's platform 47, to which is secured the seat 48 for the operator. A thrust ball bearing against sleeve 20 is effected by a race ring 50 surrounding axle 11 and contacting with the end of sleeve 20. Balls 49 are held in contact with the race ring 50 by a second race ring 51 which surrounds the axle 11. A ring 52 is secured to the axle 11 by a pin 53, as best shown in Figs. 1 and 4. Through the ring 52 is threaded a multiplicity of set-bolts 55 which engage the race ring 51 and force it together with the balls 49 and race ring 50 against the end of sleeve 20 with sufficient force to resist the end thrust upon the sleeve caused by any of the driving pinions 24, 25 or 26.

A second annular flange 56 concentric with the flange 34 on the annular plate 35 is spaced therefrom a suitable distance so as to form an annular channel 57 between flanges 34 and 56 that just receives pinion 32, as best shown in Fig. 5. Grooves 58 and 59 are formed in the flanges 56 and 34 and these respective grooves are filled with packing 60 and 61 which is engaged by a circular plate 62 secured to angle pieces 63. These angle pieces in turn are adjustably secured by set-bolt and slot connections 64 with the frame 10. In this manner the channels 57 are tightly sealed against the entry of dust. The pinion 31 on the shaft 29 and the pinion 32 on the sleeve 30 which is extended into the channel through a dust-proof bearing passing through plate 62, are thus inclosed in the channels 57, which may contain a suitable amount of hard oil, thereby insuring perfect lubrication without waste of grease.

The advantages of my invention will be apparent. The drive is at all times by direct linear continuation of the crankshaft of the engine. No gears are shifted. The drive to the bevel gears is always directly from the horizontal shaft in alinement with the crankshaft, and the end thrust from such bevel gear drive is effectively compensated by the adjustable ball bearing which not only holds the gears but also can be adjusted from time to time to take up wear. There is great reduction of parts and at the same time the highest efficiency in transmission. The main drive pinions on the traction wheels, usually subject to intense wear because of continual drift of dirt, sand, etc., from the wheels, are perfectly housed in a channel wherein only a comparatively small amount of grease is needed to effect perfect lubrication.

I claim:

1. A traction engine comprising a frame, a stationary axle and traction wheels thereon supporting said frame, a motor carried by the frame having its crankshaft extending longitudinally thereof, a drive shaft in longitudinal alinement with said crankshaft extending through said axle and parallel with the horizontal diameter of said traction wheels, means for clutching said drive shaft to the crankshaft, a multiple bevel gear journaled upon the axle alongside of said drive shaft, means for selectively clutching said drive shaft to portions of said bevel gear and on either side of the axle for driving the same at different speeds ahead and in reverse direction, and means operative from said bevel gear for driving the traction wheels.

2. A traction engine comprising a frame, a transverse axle rigidly connected with the frame and traction wheels on the axle supporting the frame, driving and transmission mechanism for said traction wheels comprising a drive shaft extending through said axle and parallel with the horizontal diameter of said traction wheels and having bevel pinions thereon, a multiple bevel gear journaled on the said axle and coöperating with said bevel pinions, a thrust bearing surrounding said axle and engaging the hub of said bevel gear for holding it in effective operative position, and means for adjusting said thrust bearing to take up wear in the bevel pinions and gear.

3. A traction engine comprising a frame, a stationary axle and traction wheels thereon supporting said frame, driving and transmission mechanism for said traction wheels comprising a drive shaft extending through said axle and parallel with the horizontal diameter of said traction wheels and having beveled pinions thereon, a sleeve rotatably mounted on said axle, a multiple bevel gear secured to one end of said sleeve and meshing with said bevel pinions, a gear secured to the other end of said sleeve, and driving connections between said gear and said traction wheels.

In testimony whereof I hereunto affix my signature.

GILBERT AMONSEN.